Dec. 31, 1963  P. C. SHERBURNE  3,116,045
RELEASABLE PIPE POSITION CONTROL
Filed Dec. 8, 1960  5 Sheets-Sheet 1

FIG. 1

INVENTOR
PHILIP C. SHERBURNE
BY
*David D. McKenney*
ATTORNEY

Dec. 31, 1963     P. C. SHERBURNE     3,116,045
RELEASABLE PIPE POSITION CONTROL Filed Dec. 8, 1960     5 Sheets-Sheet 2

FIG. 2

INVENTOR.
PHILIP C. SHERBURNE
BY
ATTORNEY

Dec. 31, 1963    P. C. SHERBURNE    3,116,045
RELEASABLE PIPE POSITION CONTROL
Filed Dec. 8, 1960    5 Sheets-Sheet 4

INVENTOR.
PHILIP C. SHERBURNE
BY
*David W. McKenney*
ATTORNEY

INVENTOR.
PHILIP C. SHERBURNE
BY David P. McKenney
ATTORNEY

United States Patent Office 3,116,045
Patented Dec. 31, 1963

3,116,045
RELEASABLE PIPE POSITION CONTROL
Philip C. Sherburne, Rumford, R.I., assignor to Grinnell Corporation, Providence, R.I., a corporation of Delaware
Filed Dec. 8, 1960, Ser. No. 74,713
17 Claims. (Cl. 248—58)

This invention relates to apparatus and methods for controlling the positioning of fluid handling equipment when it is subjected to condition changes. More particularly, it has to do with apparatus and methods for applying force to fluid handling equipment in a controlled manner to force at least a portion thereof to assume a predetermined position different than it would otherwise assume after a condition change as, for example, after an increase in temperature.

Apparatus and methods of this type have been proposed heretofore in which a force applying mechanism is actuated upon a change in the equipment condition to move the equipment portion to a predetermined position and to hold it in this location until a further change in condition again actuates the mechanism to return the portion or to move it on to another position, as the case may be.

A typical application of these prior proposed methods and apparatus contemplates the use of motor driven jack mechanisms to exert force on an elongated piping system upon a change in temperature thereof to force at least a portion of the system to a position different than that which it would otherwise occupy at this changed temperature and to hold in such position to insure safe stresses on the critical terminal connections of such system.

By and large these mechanisms and the controls therefor are very reliable, but because they hold the pipe in a fixed position with respect to building structure when they are deactuated, a failure of a force exerting mechanism to be actuated in its intended manner because the mechanism will not run properly will result in the pipe being prevented from moving away from the position in which it is held when the mechanism fails. Until the mechanism can be repaired, this fixing of the pipe portion during a subsequent temperature change can in itself result in very undesirable stress conditions within the system.

Accordingly, it is an object of this invention to overcome this difficulty by providing for release of the force exerted by the force exerting mechanism in the event it fails as above mentioned.

The invention is particularly useful in a fluid handling system which has a portion having a calculated position to which it would go upon a change in temperature and at which the stresses on the terminal connections are known to be safe, except for certain uncalculatable factors such as non-uniform pipe deformation and friction in associated weight supporting equipment and guiding apparatus. As a result of these factors the system portion may move to a position other than the calculated position at which such stresses may not be safe unless a force of the type referred to above is applied. In such a case, it is sometimes enough to apply such force to achieve the calculated position and it is unnecessary to continue to hold such portion in the calculated position once it is there.

Accordingly, it is another object of the invention to provide a force applying mechanism which will force such portion to its calculated position and which will, in response to its arrival at that position, at least partially release the force.

In other cases, the portion may not remain in the calculated position to which the force has moved it when the force is released, for example, because of the resiliency of the material of the fluid handling equipment.

Accordingly, it is another object of the invention to provide controls for reapplying the released force, if the force exerting mechanism is still able to run and the portion moves away from the calculated position upon release of the force, to force such portion to return to such position. On the other hand, if the mechanism is unable to run, the force is not reapplied and the portion is free to move as though the force exerting mechanism were not present.

Preferably the force applying mechanism of the invention incorporates means for actuating and deactuating force applying means in response to a change in condition of the system and means for releasing the force applying means when the force applying means is deactuated.

In a preferred embodiment, the force applying mechanism comprises a hydraulic piston and cylinder unit driven by a pump which is actuated and deactuated by changes in a condition of the system, and having means for dissipating pressure between the opposite sides of the piston when the pump is deactuated.

Other objects and advantages will be apparent from the following description and from the accompanying drawings in which.

With reference to FIGS. 1 to 6, the solid line 2 represents a piping system at room temperature connecting a boiler 4 at connection 6 and a turbine 8 at connection 10. The dotted line 12 represents the calculated position of the piping system at operating temperature. The system is deliberately designed so that it would move to this position (at which the stresses on critical connections 6 and 10 are safe) if the pipe were uniform, if the auxiliary supporting equipment were frictionless and if the supporting equipment were properly set. The dot-dash line 13 represents the position that the system might assume because in practice the pipe is seldom uniform, and there is usually friction in the auxiliary equipment. Also it sometimes happens that the supporting equipment is not properly set.

Figure 1:
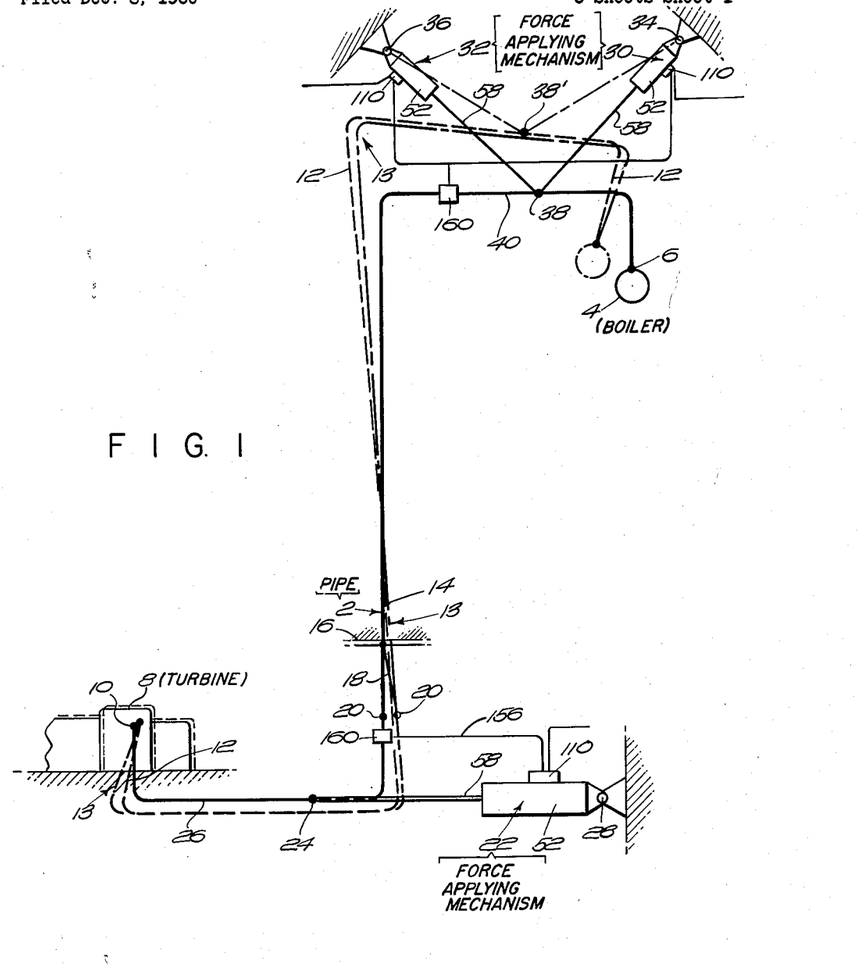
FIG. 1 is a diagrammatic view of a steam piping system embodying the present invention and showing positions of the system at room temperature and at an elevated operating temperature.

The vertical section 14 is vertically anchored to the building structure 16 by a pair of arms 18 pivotally attached to the building structure and to the vertical pipe section at 20 which is at about the same elevation as connection 10.

A force applying mechanism 22 attached at one end at 24 to the horizontal pipe segment 26 and pivotally attached at its other end at 28 to the building structure forces at least the portion of the piping system between 24 and 10 to assume its calculated position 12 shown in dotted lines at operating temperature rather than its position 13 shown in dot-dash lines which it might otherwise assume.

Force applying mechanisms 30 and 32, each of the same construction as unit 22 and each being pivotally attached at 34 and 36, respectively, at one end thereof to building structure and at the other end at 38 to the pipe section 40, force the portion of the piping section between 38 and 6 to assume its calculated position 12 at operating temperature rather than its position 13.

Figure 2:
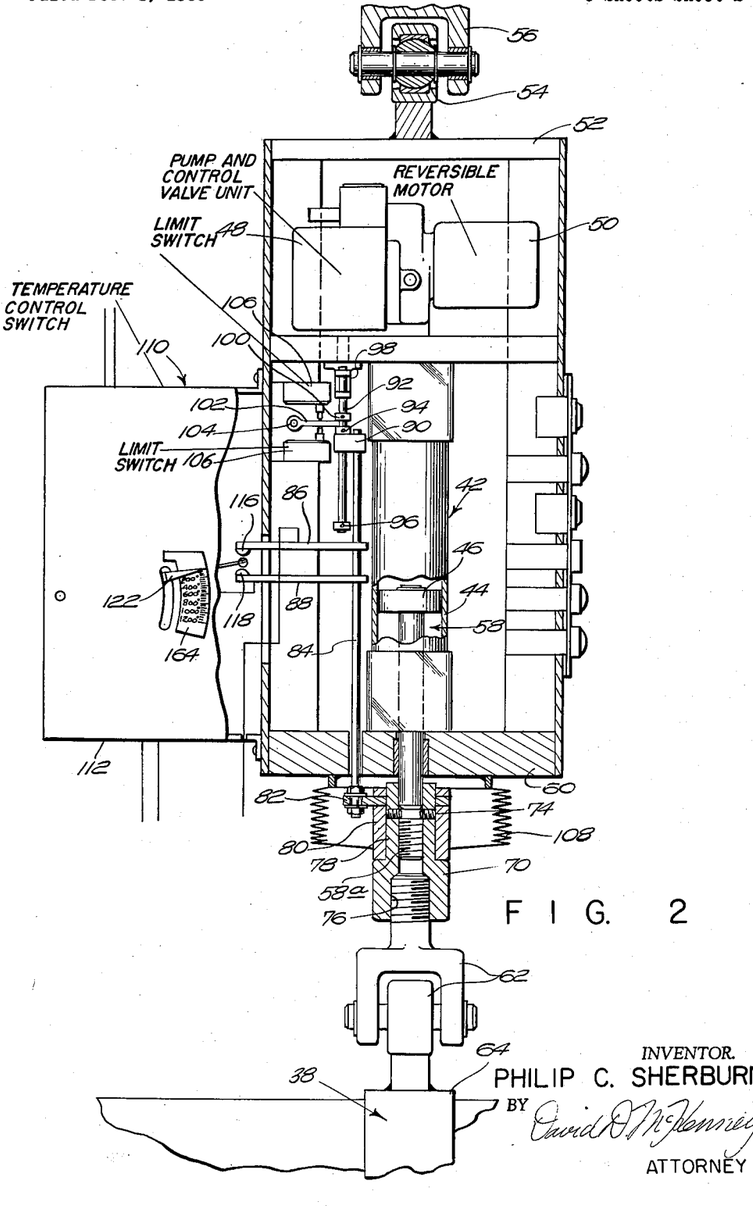
FIG. 2 is a cross-sectional side elevation of an embodiment of the force applying mechanism of FIG. 1 for applying a force to the pipe to force it to the predetermined position shown in dotted lines in FIG. 1 and for releasing such force.
Figure 3:
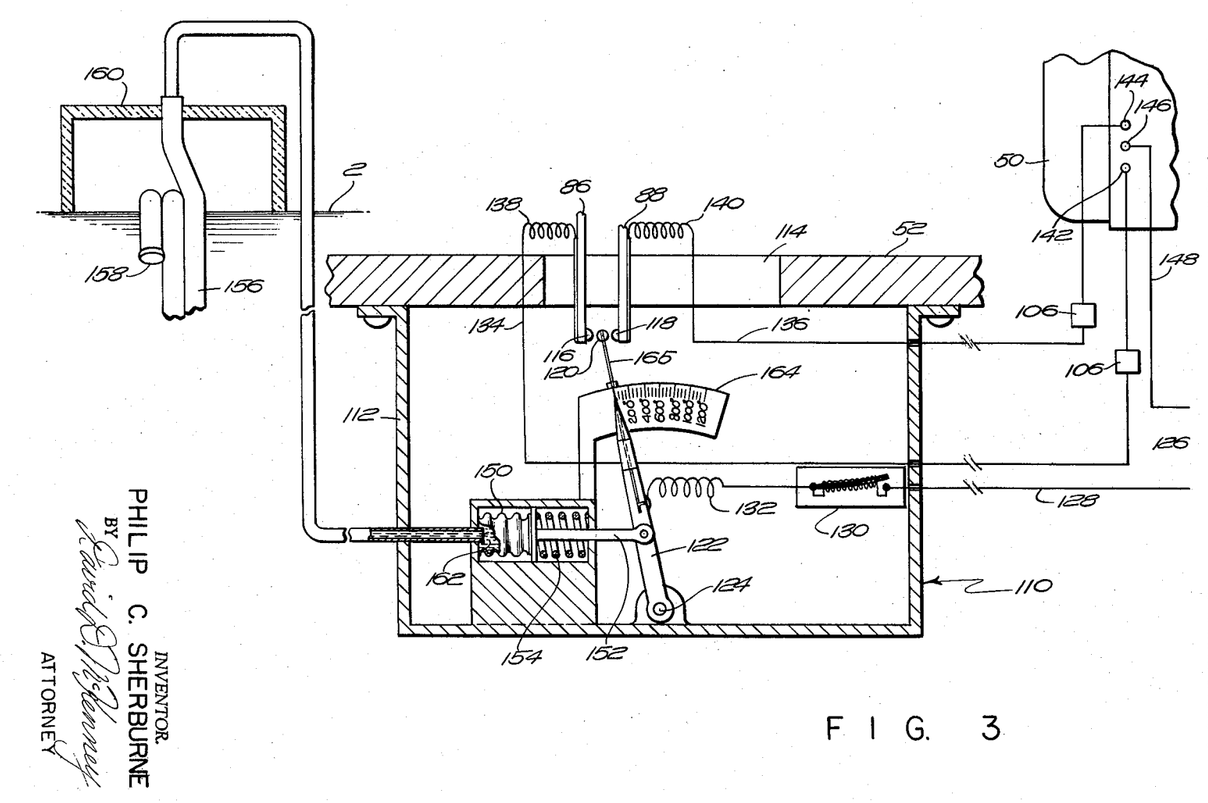
FIG. 3 is a diagrammatic cross-sectional view of the switch mechanism mounted on the force applying mechanism of FIG. 2 and includes a diagrammatic cross-sectional view of the temperature responsive mechanism for controlling this switch mechanism.

With reference to FIGS. 2 and 3, each of the above-mentioned force applying mechanisms comprises a hydraulic piston and cylinder unit 42 having a cylinder 44, a piston 46, a pump and control valve unit 48 for pumping hydraulic fluid between the opposite sides of the piston to thereby move it and a reversible motor 50 for driving the pump.

The cylinder 44, the pump and valve unit 48 and the motor 50 are mounted on a housing frame 52, the upper end of which is pivotally connected by a universal joint 54 to the building structure by a bracket 56.

The piston 46 carries a piston rod 58 which passes movably through one end 60 of the frame and in the case of units 30 and 32 is pivotally connected exteriorly of the frame by a universal joint 62 to a bracket 64 secured to the pipe at 38. In the case of the force exerting unit 22, the rod 58 is connected to point 24 by a universal joint.

For ease of assembly and disassembly, the piston rod 58 includes a sleeve 70 threaded on shaft portion 58a of rod 58 and held thereon by setscrews 74, and this sleeve is in turn threaded at 76 to secure it to the universal joint 62. The upper end of the sleeve 70 is reduced at 78 to receive a second sleeve 80 which carries an outstanding arm 82 to which is attached the lower end of a control rod 84 which passes slidably into the frame through the end 60 thereof alongside and parallel to the piston and cylinder unit 42. This control rod carries a pair of switch arms 86 and 88 which together with the control rod move upwardly and downwardly in unison with the piston 46. The operation of these switch arms will be described in more detail hereinafter.

In addition, the control rod 84 also carries a block 90 which is slidable on a second rod 92 which is provided with stops 94 and 96 and which is itself slidably mounted in bracket 98 affixed to the frame. Carried on the rod 92 is another block 100, and blocks 94 and 100 closely embrace the sides of a switch lever 102 pivotally mounted to the frame at 104 and engaging on its upper and lower sides the armatures of a pair of limit switches 106 also mounted on the frame. The purpose of these last described components is to turn off the motor 50 and stop the operation of the mechanism when the movement of the piston reaches predetermined limits of travel. Thus, if, because of a failure of the temperature controlled switching hereinbelow described the piston 46 continues to move in an upward direction, the block 90 will eventually engage the stop 94 and move the rod 92 to actuate the upper switch 106 and turn off the motor. The same is true with respect to the other direction in which the block 90 engages the block 96 and actuates the lower switch 106.

A bellows type dust cover 108 is connected to the frame end 60 and to the piston rod 58 to protect the interior of the frame which can be otherwise sealed in a conventional manner.

With reference to FIG. 3, the temperature control switch indicated by numeral 110 in FIGS. 1, 2 and 3 comprises a casing 112 mounted adjacent an opening 114 in the side of the frame 52 of the force exerting unit through which opening switch arms 86 and 88 extend, this opening being large enough to accommodate maximum movement of the arms during operation of the force applying mechanism. The ends of these arms carry on their adjacent sides a pair of electrical contacts 116 and 118 which are spaced apart from each other and embrace a contact 120 carried on the end of a lever arm 122 which is so pivotally mounted on the casing 112 at 124 that rotation of this lever arm swings the contact 120 in the direction of movement of the arms 86 and 88. When the contact 120 is midway between the contacts 116 and 118, it is slightly spaced from both of them and the circuits to the motor 50 are open.

Electric power for this motor is derived from a source 126 by means of a wire 128 leading to a time delay switch 130, then through a flexible wire section 132 to the lever arm 122, which conducts current to contact 120. From the lever arms 86 and 88 wires 134 and 136 with suitable flexible sections 138 and 140 to allow for free switch arm movement lead to terminals 142 and 144 of reversible motor 50. From a third motor terminal 146 a wire 148 leads back to the source 126 through the normally closed limit switches 106. When the contact 120 is moved into engagement with the contact 116, a circuit is completed from the source including terminals 142 and 146 which cause the motor to rotate in one direction, and similarly when contact 120 engages contact 118, a circuit is completed including terminals 144 and 146 causing the motor to rotate in an opposite direction.

The lever arm 122 is moved by a fluid pressure operated bellows 150 through a rod 152 with a spring 154 interposed between the casing 112 and the bellows to urge the lever arm to the left in FIG. 3. Fluid pressure for operating the bellows is derived from a fluid filled coil 156 which is disposed adjacent the pipe 2 at some convenient location thereon and has its end 158 closed. This coil is shown housed in a jacket 160 to insure that the temperature of the coil will follow that of the pipe. The fluid 162 completely fills the coil and bellows and is of a type which will expand with increases in temperature. The coil 156 is of such length that the increase in volume of the fluid due to the expansion thereof is sufficient to produce adequate movement of the bellows 150 and hence of the lever 122. Accordingly, this coil, bellows and lever arm 122 are essentially a thermostatic unit in which the movement of the arm 122 is a measure of the temperature of the pipe 2, and this is further illustrated by the scale 164 adjacent the lever arm 122 and which is calibrated in temperature degrees. At room temperature, enough fluid 162 is in the system to hold the lever 122 in the position shown against any force exerted by the spring 154. The operation of the switching device is as follows:

Starting from the positions of the parts shown in FIG. 3 in which the temperature of the pipe is assumed to be room temperature and the motor 50 is turned off because the contact 120 is out of engagement with both contacts 116 and 118, an increase in temperature, for example of 50° F., causes the fluid 162 to expand and move the lever 122 to the right against the action of spring 154 to bring the contact 120 into engagement with the contact 118.

When the contact 120 engages the contact 118, the motor is turned on in a direction to cause the piston 46 and piston rod 58 to move in that direction which carries the switch arms to the right in FIG. 3, i.e. the same direction that the lever arm was moved by the temperature increase.

The time delay switch 130 is employed and the upper end of the lever 122 is made flexible in the region 165 so that the contact 120 will engage and press against the contact 118 for a slight further movement of the arm 122 before the time delay switch closes and initiates motor operation. In this way, the motor is permitted to run for an appreciable time before the switch arm movement moves contact 118 out of engagement with contact 120, whereas if the motor were to start immediately upon switch engagement, an undesirably short intermittent motor operation would result.

Once the motor has been turned on as above described, it continues to run until the contact 118 is moved out of engagement with the contact 120, as aforesaid, at which point the motor turns off leaving the piston 46 and consequently the pipe point 38 (FIGS. 1 and 2) in a new position for the new temperature and leaving the force applying unit (30 or 32) with a new length between the points 34 and 38 in the case of mechanism 30 or between points 36 and 38 in the case of mechanism 32. For each subsequent increase in temperature, the operation of this switch unit is the same with the result that there is an intermittent on and off operation of the motor, each turning on thereof moving the pipe point 38 to a particular location for that temperature. Thus, for each temperature within the temperature range from room emperature to operating temperature, the lever arm 122 and piston 46 will have a particular position and the force exerting unit will have a particular length to hold the pipe point 38 in a predetermined location. The particular location of lever arm 122 and piston 46 and the particular length of the force applying unit and hence the particular location of the pipe point 38 will be determined by the connection between the bellows 150 and the lever 122.

In the embodiment shown in the drawings, it is assumed that the change in length of the force exerting unit between the universal joints 54 and 62 of FIG. 2 is substantially linear with changes in temperature. If these changes in length are determined to be non-linear to achieve the desired calculated position of the piping, a suitable movement of an arm corresponding to the arm 122 would be achieved by some form of cam between the bellows 150 and the lever arm 122 to provide the desired relationship of movement of one with respect to the other.

The mechanism 22 operates in the same manner as described above with respect to mechanisms 30 and 32.

Whereas the desired movement of the pipe at point 24 can be achieved by a single unit 22 because of the vertical anchor 18, the movement of point 38 is determined by the lengths of the two units 30 and 32 over the temperature range, the position of 38 at any one temperature being the intersection of the arcs of these lengths for that temperature swung about the universal connections 34 and 36 (54 in FIG. 2). Although universal joints are preferred because there may be some movements not in the plane of the drawing, it is expected in a pipe arrangement like that of FIG. 1 these movements would be very slight.

It is within the scope of this invention to employ a third mechanism in a plane which is at one angle to the plane of the drawing and connected to point 38, this mechanism acting simultaneously with mechanisms 30 and 32 to completely fix point 38 in space for each temperature.

Figure 4:
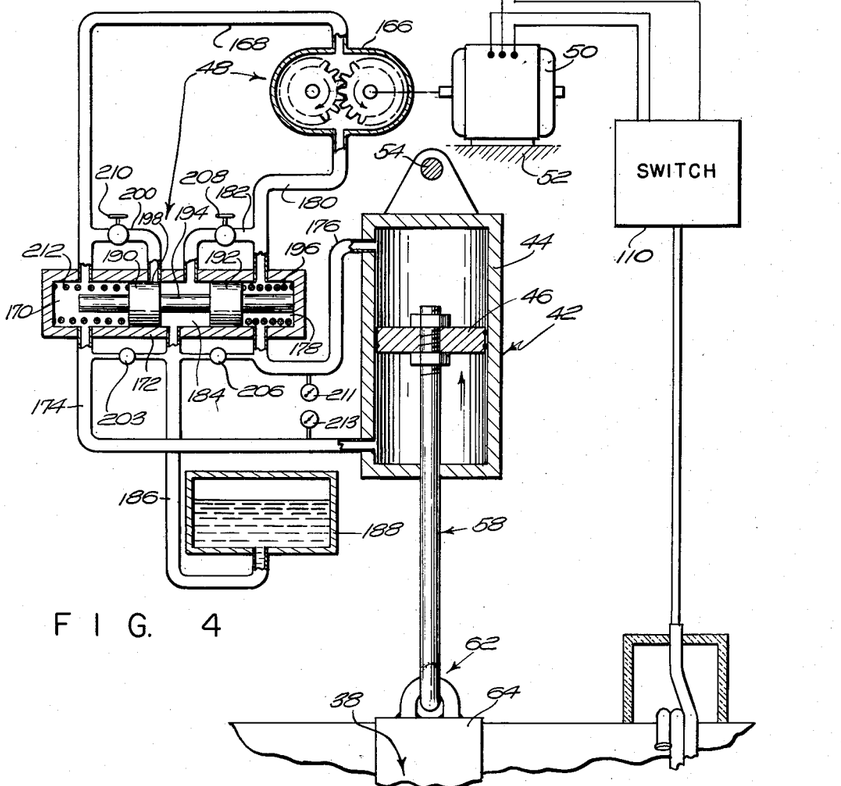
FIG. 4 is a diagrammatic representation of the hydraulic system of the force applying mechanism of FIG. 2 with the hydraulic piston thereof being driven upwardly.
Figure 5:
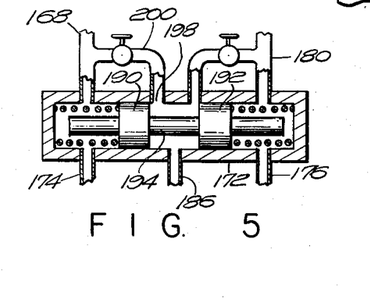
FIG. 5 is a fragmentary view of the valve of FIG. 4 in neutral position in which the force on the pipe is released.
Figure 6:
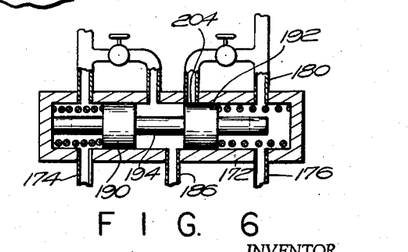
FIG. 6 is like FIG. 5 except that the valve is in a different position in which the hydraulic piston is being forced downwardly.

Referring to FIGS. 4 to 6, operation of the reversible motor 50 in one direction will actuate the hydraulic gear pump 166 in one direction to pump hydraulic fluid through conduit 168 to a chamber 170 at one end of a control valve 172 and then through conduit 174 to the underside of piston 46 to move the piston and piston rod 58 upwardly to shorten the length of the force exerting unit. At the same time, fluid on the upper side of the piston 46 is drawn through a conduit 176 to a chamber 178 at the other end of the valve 172 and from this chamber through a conduit 180 to the intake side of the pump 166.

The increase in volume on the underside of the piston 46 is less for a given piston movement than the decrease in volume above this piston because of the piston rod. To take care of this, the excess fluid is forced from the conduit 180 through conduit 182 to a central valve chamber 184 and thence through conduit 186 to a reservoir 188.

The valve 172 is a hollow cylinder in which the three above-mentioned chambers are defined by a pair of spaced lands 190 and 192 on a rod 194.

The pressure in chamber 170 urges these lands from a neutral position as shown in FIG. 5 to the right against the action of a first centering spring 196 in chamber 178 to close the port 198 of a conduit 200 to prevent the pump from being by-passed through the conduit 200, chamber 184 and conduit 182 and to prevent fluid under pressure from passing from conduit 168 to chamber 184 and thence through conduit 186 to the reservoir 188.

The right end of rod 194 limits the movement thereof by engaging the end wall of chamber 178.

The above-mentioned operation of the pump and resulting movement of the piston 46 caused by actuation of the switch 110 by a change in temperature will continue until this switch turns off the motor 50 when the piping reaches the predetermined position for it at the changed temperature. When this happens, the pressure in chamber 170 is slowly relieved because of leakage through the pump which is deliberately designed to have such leakage, whereupon the lands 190 and 192 are moved by the centering spring 196 from the position shown in FIG. 4 to the left to uncover the port 198 and establish communication between the two sides of the piston 46 and the reservoir 188 as follows: conduit 174, chamber 170, conduit 168, conduit 200, chamber 184, conduit 182, conduit 180, chamber 178 and conduit 176. This allows the spring 196 to move the lands to the neutral position shown in FIG. 5 in which port 198 is completely open and the communication between the two sides of the piston is at its maximum. This permits free movement of the piston 46 so that if it wants to move from the position to which it was forced during operation of the pump, it is free to do so after the motor is turned off and consequently the force on the pipe is released. However, if the motor continues to be operative, the resulting movement of the piston 46 will again close the switch 110 to actuate the motor and pump to return the piston to its set position for the temperature and hence the piping to its predetermined position for this temperature. However, if the motor fails, the piping is free to move as though the force exerting mechanism were not connected to it.

A pressure relief valve 203 is located between the conduits 174 and 186 and set to open at a predetermined high pressure in the event that the switch 110 or motor 50 or the control valve fails to function properly. With such a pressure relief valve, not more than a certain maximum force can be inserted on the pipe line.

Operation of the reversible motor in the opposite direction is identical to that above described except that the lands 190 and 192 are moved to the left as shown in FIG. 6 to cover port 204 of conduit 182 and make-up fluid from reservoir 188 is supplied to the upper side of the piston 46.

Again, a pressure relief valve 206 is employed, this time between conduits 176 and 186 and having the same function as the pressure relief valve 203.

Each of the by-pass lines 182 and 200 has an adjustable restriction 208 and 210 therein to control the rate at which the fluid can pass from one side of the piston 46 to the other when the motor is turned off and the valve is in neutral position. Thus, while it is desirable to allow the pipe to be free to move with temperature changes when the motor is turned off, if its rate of movement due to the tendency of the pipe, to move away from its calculated position for example to the position shown in dot-dash lines in FIG. 1 is not retarded, the switch 110 may operate very frequently and thereby cause rapid intermittent operation because of the relatively rapid last mentioned movement of the pipe when the motor is turned off. These adjustable restriction valves 208 and 210 can be set so that the intermittent operation is not unduly rapid and the motor is prevented from excessively frequent on-off operation. However, the restriction openings must not be so small as to unduly interfere with pipe movement due to temperature change when the motor is turned off.

In addition, some restriction is desirable in the conduits 182 and 200 to permit a differential pressure between chambers 170 and 178 to move the lands 190 and 192 when the pump turns on.

The leakage referred to above for example through the pump, the restriction valves 208 and 210 and the springs 196 and 212 must be selected, arranged and adjusted so that the force exerted on the hydraulic fluid by the pipe through the piston 46 will not maintain the pressure in chamber 170 (or 178) too high to permit the springs to uncover the appropriate port 198 or 204 when the pump stops. In other words, for any given load the pressure drop in chamber 170 (or 178) when the pump turns off must carry the pressure below that pressure which will hold the land over its port against the action of the spring.

It is within the scope of the invention to provide for adjustment of spring tension to take care of different forces which might be exerted by the piping.

By determining the maximum pressure drop across chambers 170 and 178 which would result from the force exerted by the pipe on the piston for a given leakage in the pump and elsewhere when the pump is stopped, as for example by pressure gages 211 and 213, the correct spring tension to overcome such pressure drop can be determined and the springs designed to exert that tension which will move the lands to uncover the ports.

Figure 7:
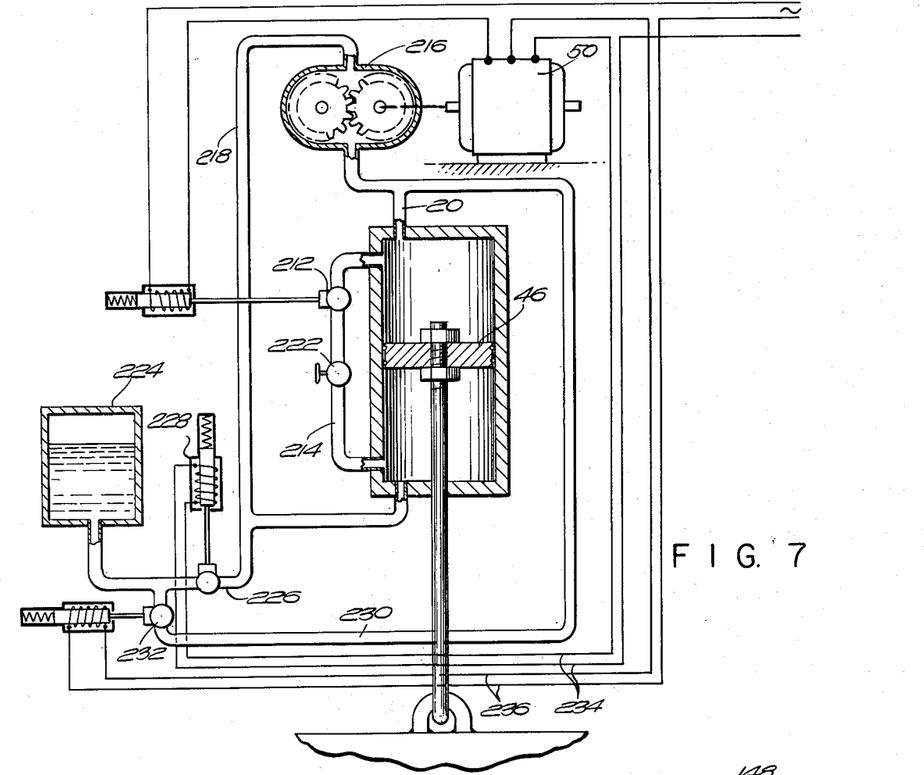
FIG. 7 is a view like FIG. 4 showing another hydraulic flow arrangement.

FIG. 7 shows another type of hydraulic mechanism in which a solenoid valve 212 is located in a by-pass line 214 interconnecting the two sides of the piston 46.

With such a by-pass, one side of the pump 216 is connected by a conduit 218 directly with the underside of the piston and a conduit 220 connects the other side of the pump to the upper side of the piston. The solenoid valve 212 is wired to the circuit of the motor 50 so that as long as the motor is running in either direction, this valve 212 is closed. When the motor is turned off or its circuit is otherwise opened, current ceases to flow in the solenoid and the valve 212 opens.

An adjustable restriction 222 in the by-pass 214 serves to control the rate at which the piston 46 can be moved by the pipe in the same manner as adjustable restrictions 208 and 210 in FIGS. 4–6.

With this arrangement of FIG. 7, the problem of supplying make-up fluid from a reservoir and of diverting excess fluid to such reservoir is taken care of by connecting from the reservoir 224 one conduit 226 leading to conduit 218 and provided with a solenoid valve 228 and a second conduit 230 leading from the reservoir to the conduit 220 and provided with a similar solenoid valve 232. When the pump is operating to lift the piston 46, the valve 228 is closed and the valve 232 is opened by electrical circuits 234 and 236 respectively tied into the motor circuit in any well-known way to achieve these valve positions for that direction of motor operation. Conversely, when the pump is supplying fluid to move the piston downwardly, the valve 232 is closed and the valve 228 is open by the same wiring.

In both hydraulic arrangements, pressure on the pressure side of the pump is not transmitted to the reservoir during flow in either direction of pump operation.

Referring again to FIG. 1, the two mechanisms 30 and 32 connected between the building structure and the point 38 and controlled by their switches 110 and their temperature responsive device 160, as hereinabove described move this point to point 38' at the operating temperature of the system. As aforesaid, because two such units are employed, the point 38 is forced at each temperature within the temperature range to a predetermined position for that temperature. However, in accordance with the releasing feature of this invention, it may be desirable to arrange the circuits to the motors of each in such a way that if one fails to operate as distinguished from being turned off by its switch when the mechanism is operable, the other, even though operable, will also release the pipe.

Figure 8:
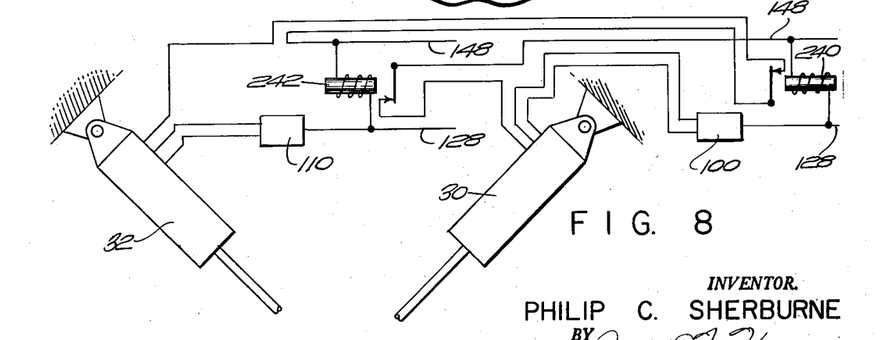
FIG. 8 shows a two unit release circuit.

FIG. 8 shows one arrangement whereby this result can be accomplished for one type of failure. In this figure the force applying mechanisms 30 and 32 each has the solenoid of a high resistance, normally closed solenoid switch 240 and 242 respectively across its lines 128 and 148 on the power source side of its switch 110. Each of these switches is in the line 148 of the other mechanism and is maintained closed by the current which will flow in its lines 128 and 148 as long as the lines are intact. By this arrangement, when the switches 110 turn off their respective mechanisms, solenoid switches 240 and 242 remain closed and releasing of the pipe is done only in accordance with the operation of its apparatus like that of FIGS. 4 or 7 as the case may be. However, if one of the power lines 128 and 148 is broken for either of the mechanisms not only does that mechanism release the pipe but because of the switches 240 and 242 the other mechanism is turned off despite the operation of its switch 110 and it also releases the pipe.

Although the force applying mechanisms described above are of a hydraulic type, they are merely illustrative of the invention and it is not intended that the invention be limited thereto, such invention being limited only by the claims hereof and their equivalents. It contemplates any type of force exerting mechanism with releasing apparatus in accordance with the claims hereof.

The term "energy valve means" (controlled coupling between the source of energy and the force applying unit), as used in the claims hereof, includes an electric switch or switches such as that numbered 116—118—120 (FIG. 3) in the drawings between the motor which drives the force applying unit and the source of electrical energy and also includes any other kind of controlled coupling by which a supply of energy to the force applying unit is regulated or modulated in accordance with changes in thermal conditions.

The terms "position" and "location" as used herein with respect to the piping or any other portion of the fluid handling equipment are used interchangeably.

I claim:

1. Apparatus for controlling the position of at least a portion of fluid handling equipment subject to a change in position due to a change in a thermal condition of said equipment, said apparatus comprising means adapted to be operably connected to said portion and responsive to said change in thermal condition for applying to said portion a force to control movement of said portion to a desired position irrespective of the position change said portion would have had due to said thermal condition change without the application of said force, energy valve means operably connected to said force applying means and adapted to be operably connected to a source of energy to control operation of said force applying means, means operably connected to said energy valve means and responsive to said change in thermal condition to control said energy valve means and to thereby correlate said desired position of said portion with said changed thermal condition, and means responsive to said portion's being moved to said desired position for at least partially releasing said force applying means, said energy valve being also controlled by movement of said portion from said desired position at said changed thermal condition due to said release of said force applying means to control said force applying means to reapply force to said portion to return said portion to said desired position.

2. Apparatus for controlling the location which at least a fluid containing portion of a fluid handling system will occupy in response to a change in a thermal condition of the system, said apparatus comprising a force-exerting unit for exerting a force on said portion, means for driving said force exerting unit, energy valve means operably connected to said driving means and adapted to be operably connected to a source of energy to control operation of said unit, means operably connected to said energy valve means and responsive to said change in thermal condition to control said energy valve means to actuate said driving means and thereby force said portion to assume a desired location at said changed thermal condition and means responsive to deactuation of said driving means for releasing said force applied to said portion by said force exerting unit.

3. Apparatus for controlling the location which at least a fluid containing portion of a fluid handling system will occupy in response to a change in a thermal condition of the system, said apparatus comprising a force exerting unit for exerting a force on said portion, means for driving said force exerting unit, energy valve means operably connected to said driving means and adapted to be operably connected to a source of energy to control operation of said unit, means operably connected to said energy valve means and responsive to said change in thermal condition to control said energy valve means to actuate said driving means and thereby force said portion to assume a desired location at said changed thermal condition, said source of energy, said energy valve means, said driving means, said means for controlling said energy valve means, said force exerting unit and the connections between the energy valve means and driving means, between the energy valve means and source of energy and between the driving means and force exerting unit all comprising a force applying mechanism and means responsive to a malfunction of said mechanism to release said force applied to said portion for movement of said portion which is substantially independent of said force exerting unit and which is in response to changes in said thermal condition.

4. A mechanism to control stresses in a fluid handling system due to a change in thermal condition of said system, said mechanism comprising a piston and cylinder unit, each having a connection point one for attachment to fixed structure and the other for attachment to said system, a reversible pump for pumping fluid to said unit to provide a pressure differential on opposite sides of said piston to move said piston and said cylinder with respect to each other to change the length of said unit between said connection points, a motor for actuating said pump, means (a) responsive to a change in said thermal condition of said system for actuating said motor to actuate said pump to change the length of said unit to a desired length at said changed thermal condition, (b) for deactuating said motor and said pump in response to achievement of said desired length and (c) responsive to a change in length of said unit from said desired length at said changed thermal condition to reactuate said motor and pump to return said unit to said desired length, and means for dissipating said pressure differential automatically in response to said deactuation.

5. For a fluid handling system, a force applying device comprising first and second members each having a connection point thereon one for connection to fixed structure and the other for connection to said system, means for applying force to force one member to move with respect to the other to change the dimension between said points, means (a) responsive to a temperature change for actuating said forcing means to change said dimension to a desired dimension, (b) for automatically deactuating said forcing means when said desired dimension is achieved and (c) responsive to a change from said desired dimension by movement of said members when said force is released to again actuate said forcing means to move said one member to achieve said desired dimension and means for releasing said force in response to deactuating of said forcing means, said members being substantially free to move with respect to each other when said force is released.

6. A method for controlling the position of at least a portion of a piping system which is subject to a change in position due to a change in temperature, said method comprising applying to said system force to force said portion of said system to move to a desired position at said changed temperature different than the position it would assume without said force when substantially weight supported at said changed temperature, said force being applied by controlling energy valve means between a source of energy and a force applying means in response to said changed temperature, and automatically releasing said force when said portion is in said position.

7. A mechanism according to claim 4 in which a fluid conduit is connected between said pump and said cylinder on opposite sides of said piston, in which said dissipating means comprises bypass conduit means for bypassing said pump, and in which said bypass conduit means has valve means automatically responsive to operation of said pump to close said bypass conduit means and automatically responsive to deactuation of said pump to open said bypass conduit means.

8. A mechanism according to claim 7, said bypass conduit means having a restriction therein.

9. A mechanism according to claim 7 in which said piston and cylinder unit is connected to a piping system which expands and contracts when subjected to changes in temperature, in which said piston and cylinder unit when actuated applies force to a portion of said system, in which said means for actuating said motor comprises energy valve means operably connected to said motor and adapted to be operably connected to a source of energy and further comprises means operably connected to said energy valve means for controlling said energy valve means to actuate said motor in response to a change in thermal condition of said system to force said portion of said system to move to a desired location at said changed thermal condition irrespective of the movement which said portion would have due to said thermal condition change without said mechanism.

10. A mechanism according to claim 7, in which at least one of said pump, piston and cylinder unit and fluid conduit are provided with leakage for initiating dissipation of said pressure differential when said pump is deactuated, said valve means being automatically responsive to said initiation of dissipation to open said bypass conduit means.

11. A mechanism according to claim 7, said valve means having means for normally biasing said valve means to open said bypass conduit when said pump is deactuated, said valve means being forced to move to close said bypass conduit means by operation of said pump and against the force of said biasing means.

12. A mechanism according to claim 7, including a fluid reservoir in communication with said fluid conduit.

13. A mechanism according to claim 12, said fluid conduit comprising a first portion providing communication between said pump and one side of said piston and a second portion providing communication between said pump and the other side of said piston, said valve means controlling communication between said reservoir and said first and second portions, said valve means being movable from a neutral position by flow of fluid from said one side of said piston to said other side of said piston by said pump to shut off communication between said reservoir and said second portion of said fluid conduit and to provide communication between said reservoir and said first portion of said fluid conduit, said valve means being movable from said neutral position by flow of fluid from said other side of said piston to said one side of said piston to provide communication between said reservoir and said second portion and to shut off communication between said reservoir and said first portion.

14. A mechanism according to claim 13, said valve means being in said neutral position when said pump is deactuated, said reservoir being in communication with said first portion and said second portion when said valve means is in neutral position.

15. A mechanism according to claim 14, said bypass conduit means being located between said first and second portions, said reservoir being connected to said bypass conduit means, said bypass conduit means being closed by each of said movements from neutral position, said bypass conduit means being open when said valve means is in neutral position, said bypass conduit means having means for restricting the rate of fluid flow therethrough.

16. A mechanism according to claim 15, said bypass conduit means having a first branch extending from said valve means to said first portion and a second branch extending from said valve means to said second portion, said means for restricting fluid flow comprising means in each of said branches for restricting the rate of flow therethrough.

17. A mechanism according to claim 12, including valve means automatically responsive to actuation of said pump in one direction to open communication between said reservoir and the low pressure side of said pump and to close communication with the reservoir and the high pressure side of said pump while said pump is operating in said one direction and automatically responsive to actuation of said pump in an opposite direction to open communication between said reservoir and the low pressure side of the pump and close communication between the reservoir and the high pressure side of the pump while said pump is operating in said opposite direction.

References Cited in the file of this patent

UNITED STATES PATENTS

| | | |
|---|---|---|
| 1,836,813 | Rankin | Dec. 15, 1931 |
| 2,291,783 | Baak | Aug. 4, 1942 |
| 2,572,386 | Ray | Oct. 23, 1951 |
| 2,636,351 | Brooks | Apr. 28, 1953 |
| 2,640,313 | Cobb | June 2, 1953 |
| 2,679,727 | McLeod | June 1, 1954 |
| 2,722,891 | Weinfurt | Nov. 8, 1955 |
| 2,787,124 | Donahue | Apr. 2, 1957 |
| 2,889,688 | Jones et al. | June 9, 1959 |